Figure 1:
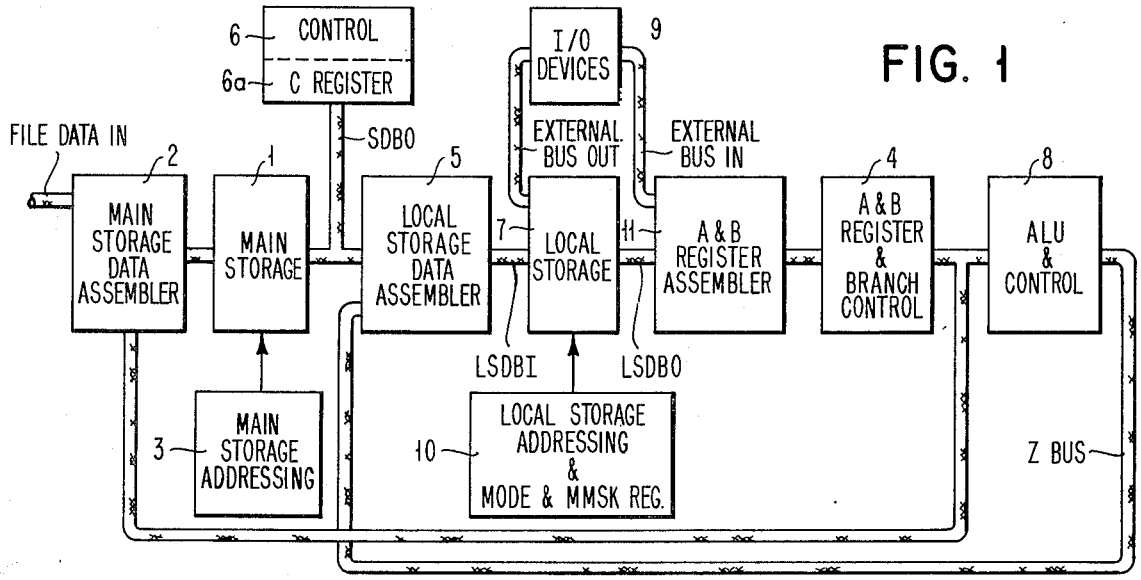
Figure 2:
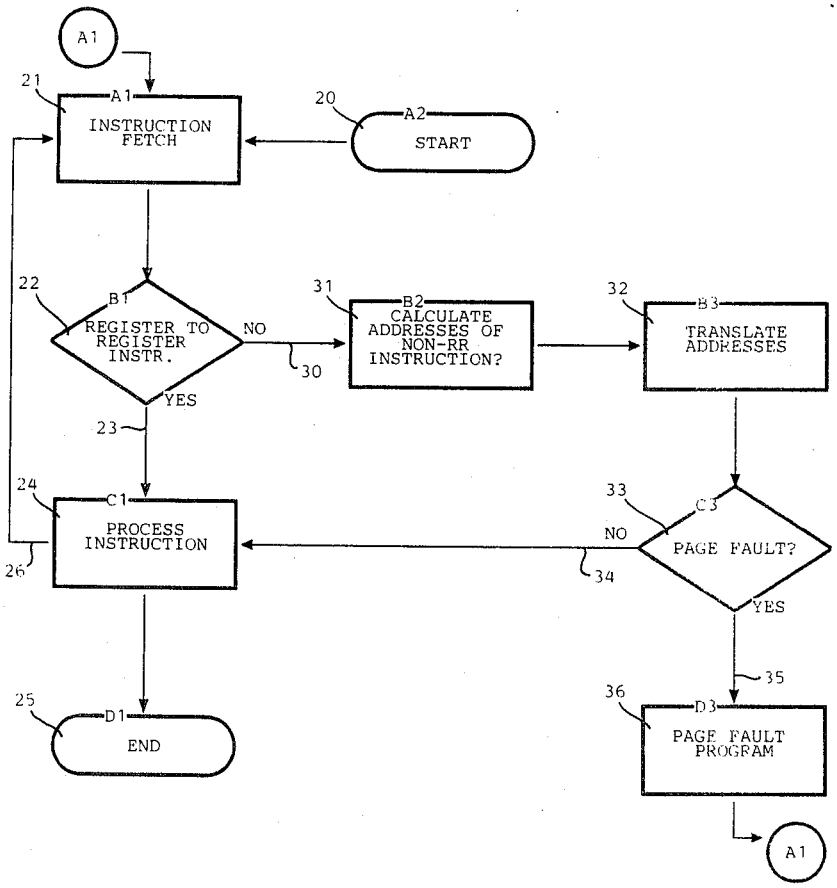
Figure 3:
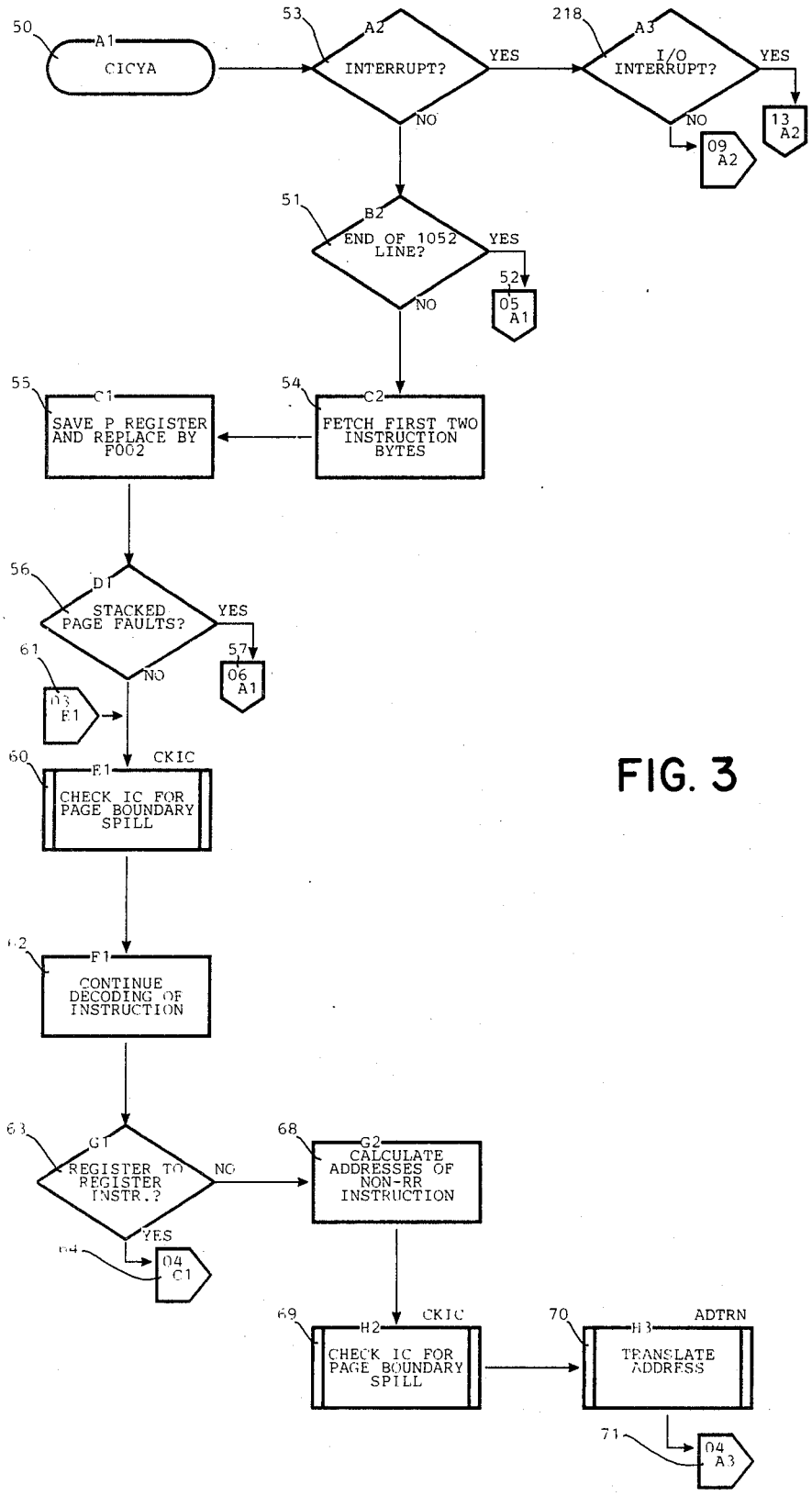
Figure 4:
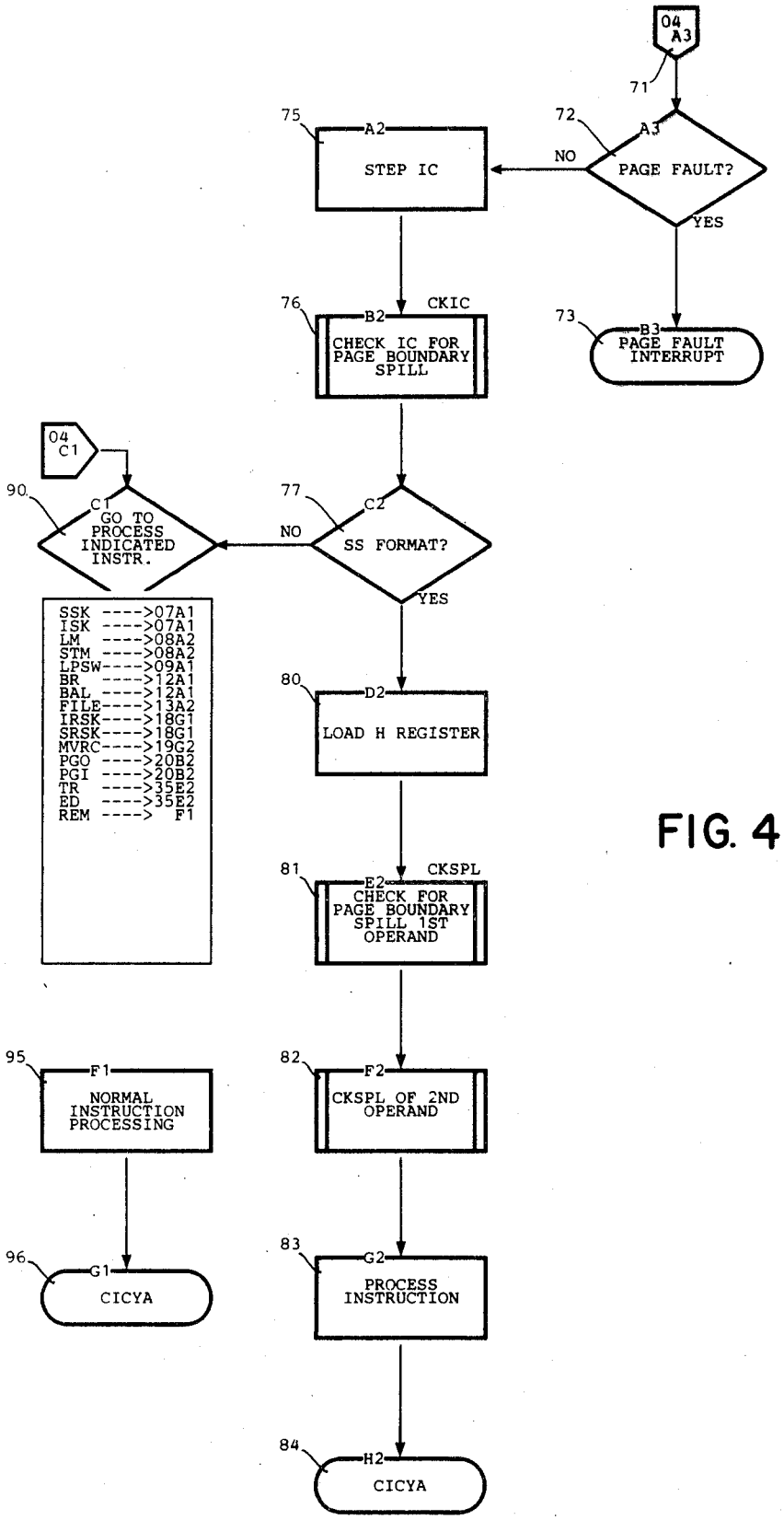
Figure 5:
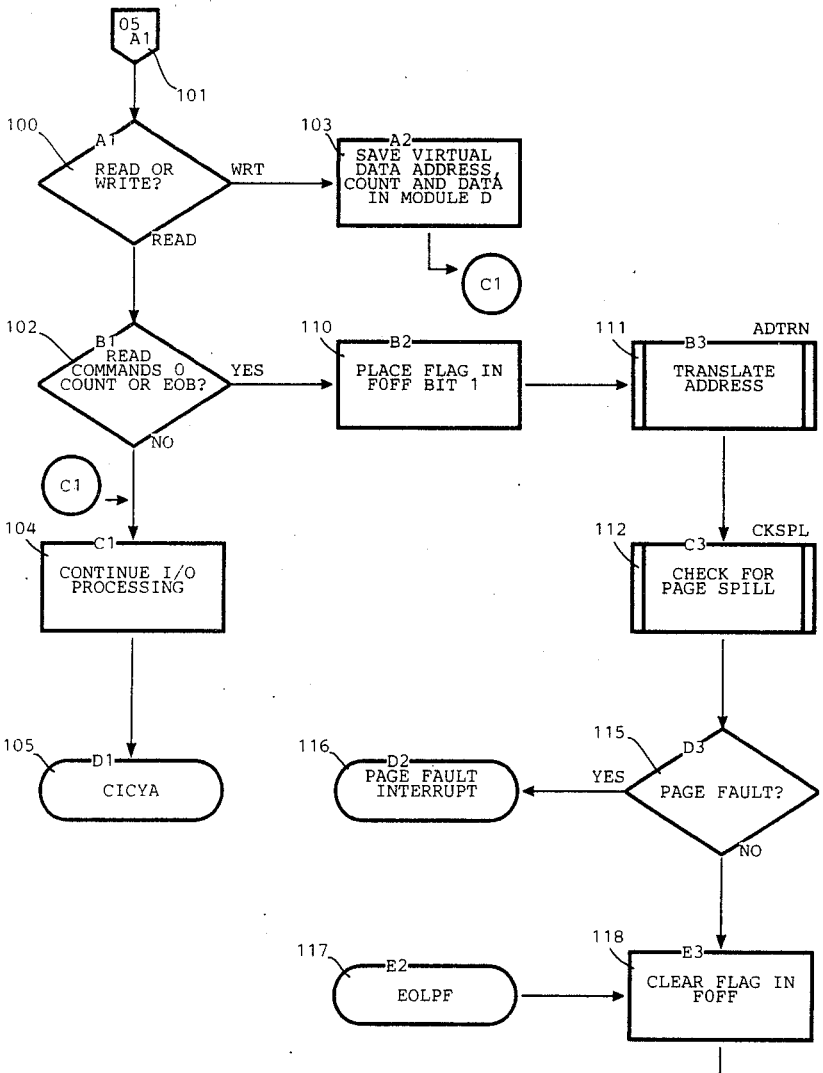
Figure 6:
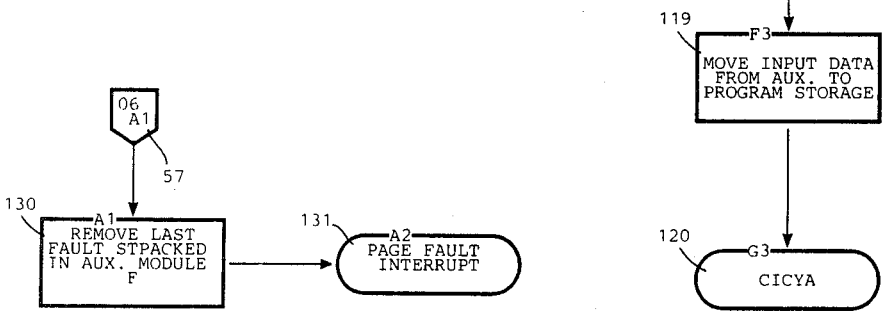
Figure 7:
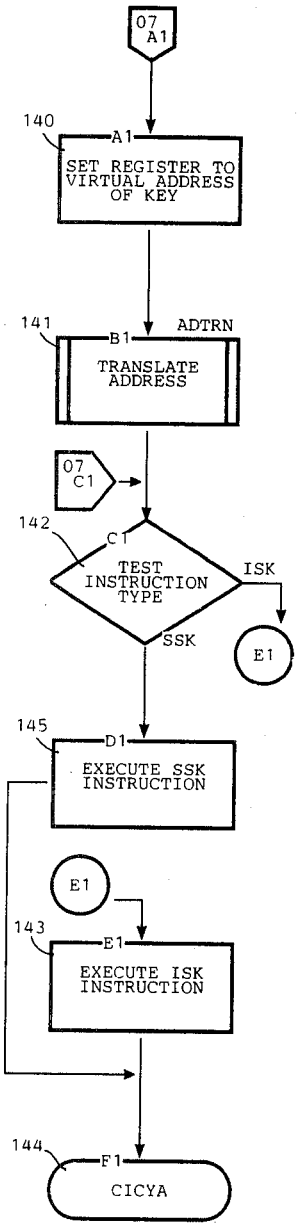
Figure 8:
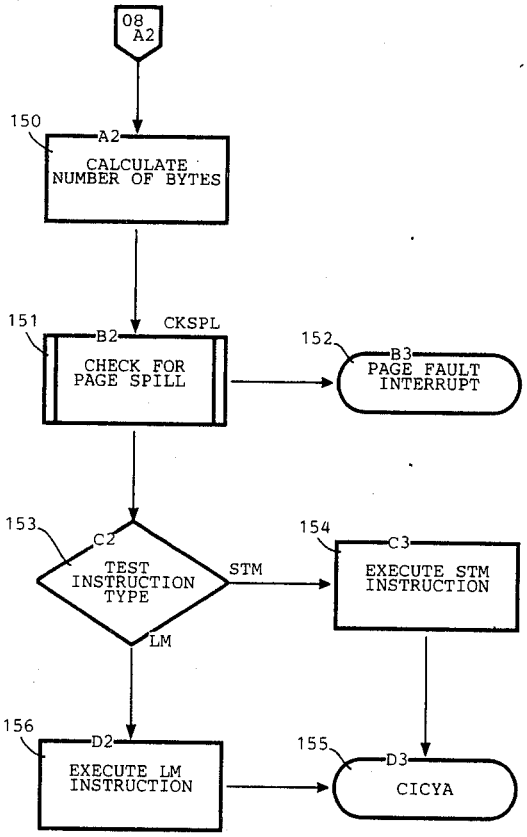
Figure 9:
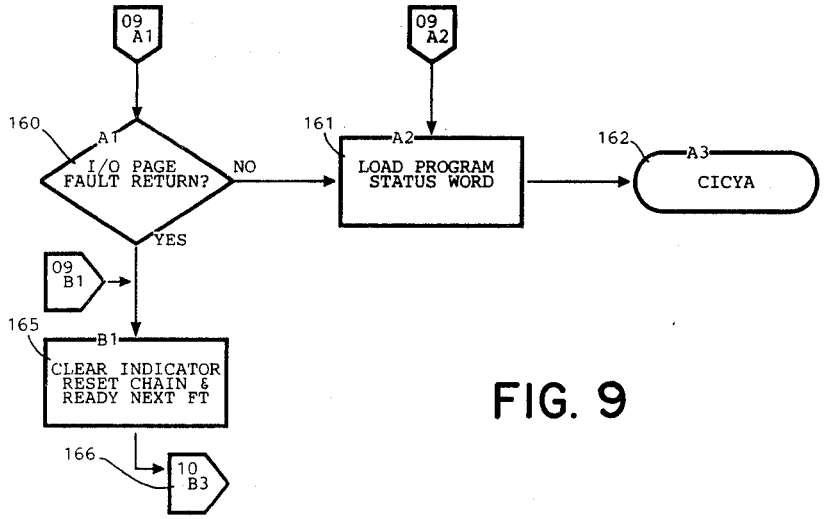
Figure 10:
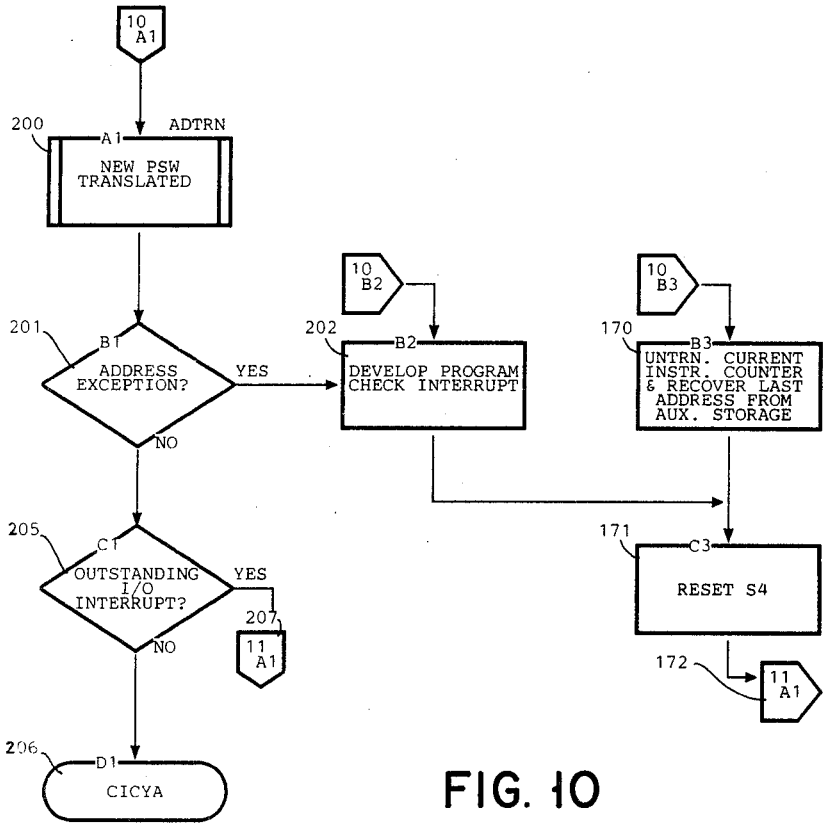
Figure 11:
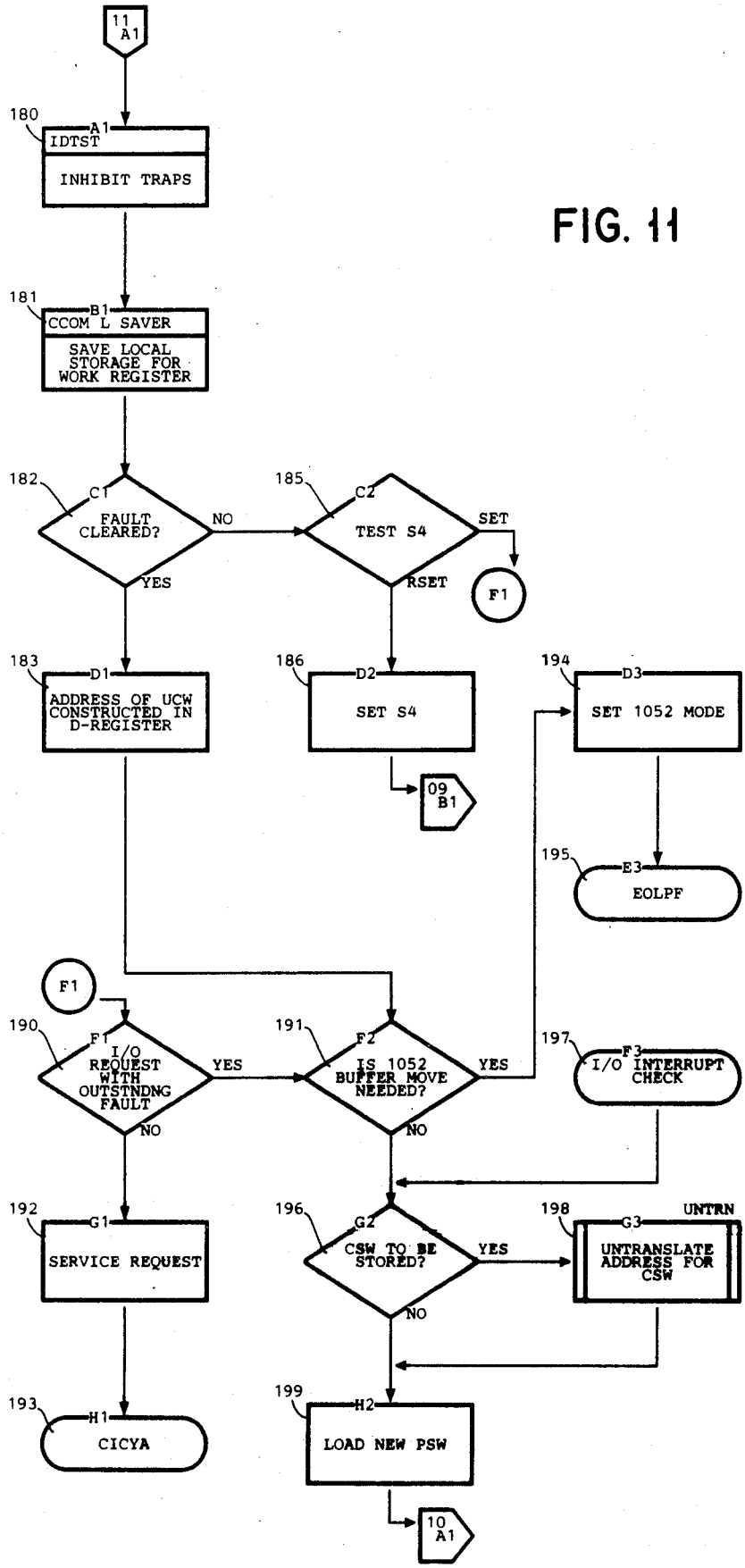
Figure 12:
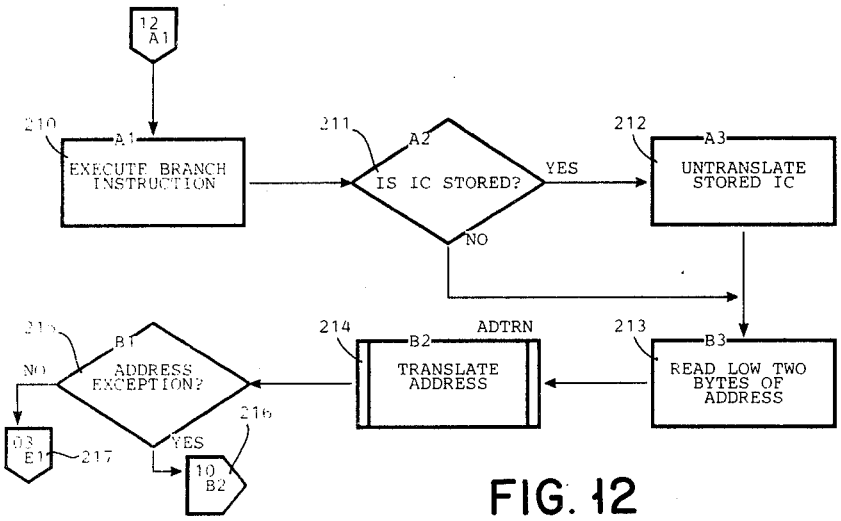
Figure 13:
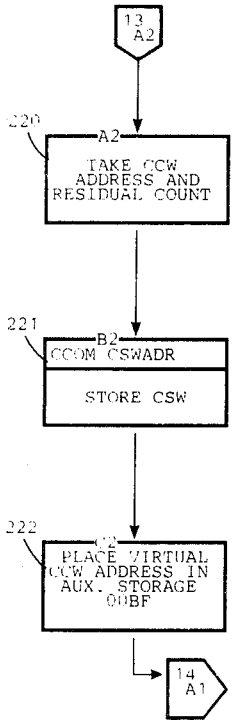
Figure 14:
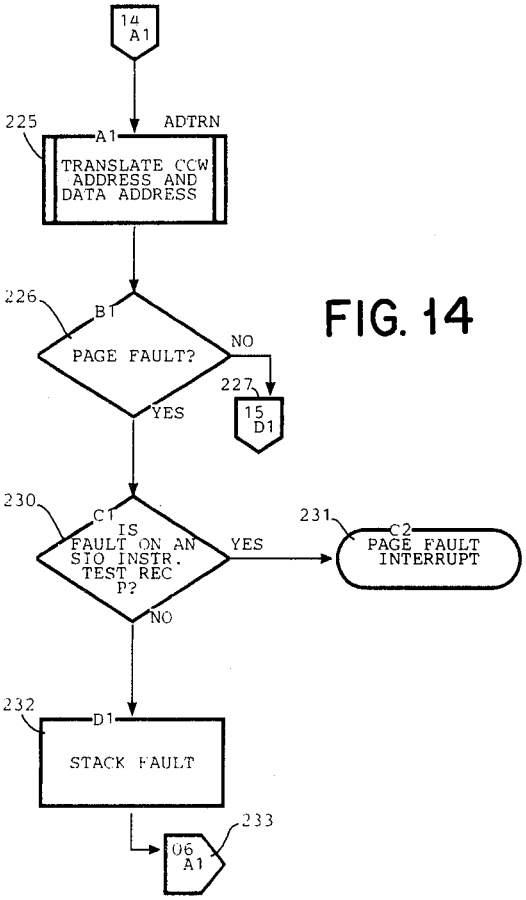
Figure 15:
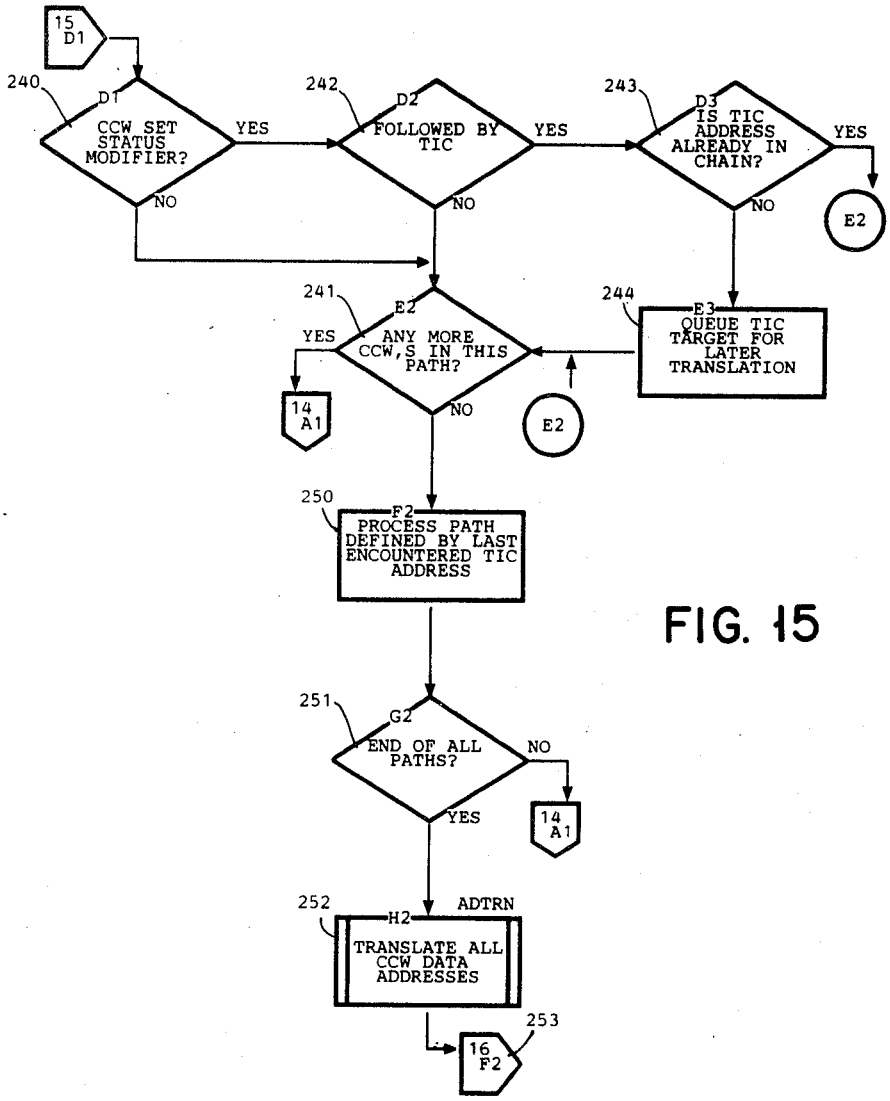
Figure 16:
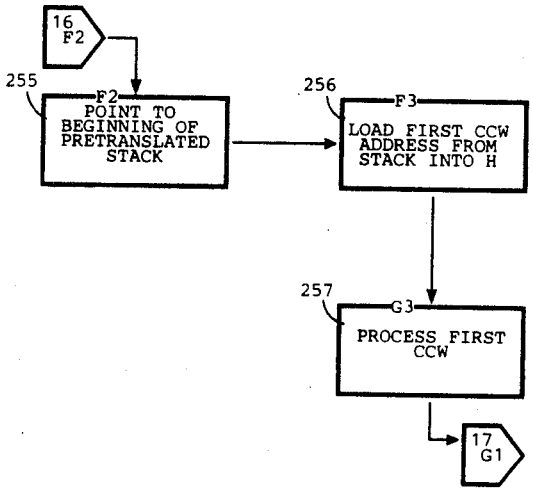
Figure 20:
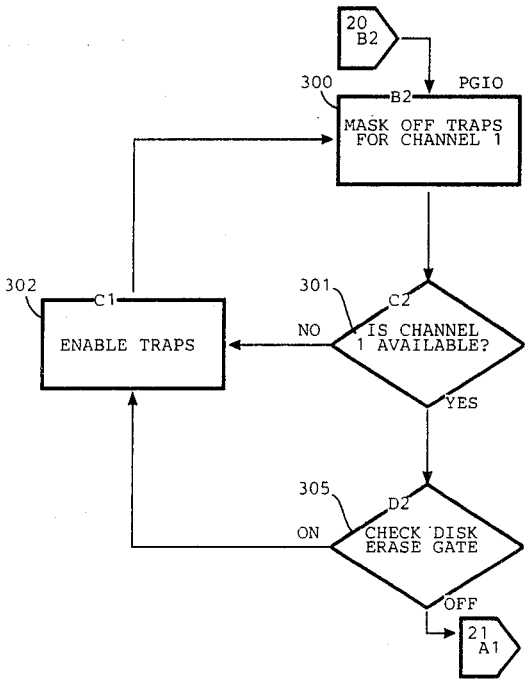
Figure 17:
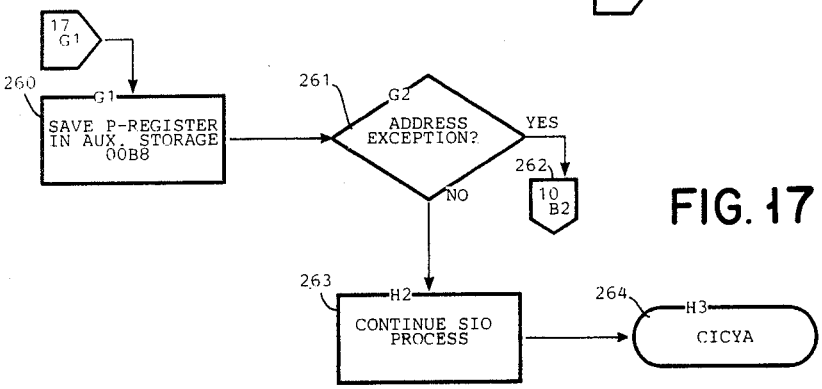
Figure 18:
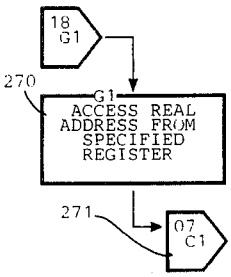
Figure 19:
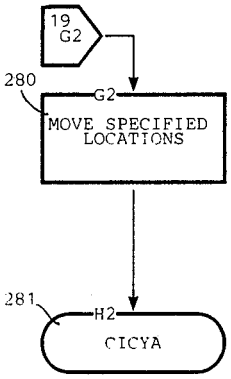
Figure 21:
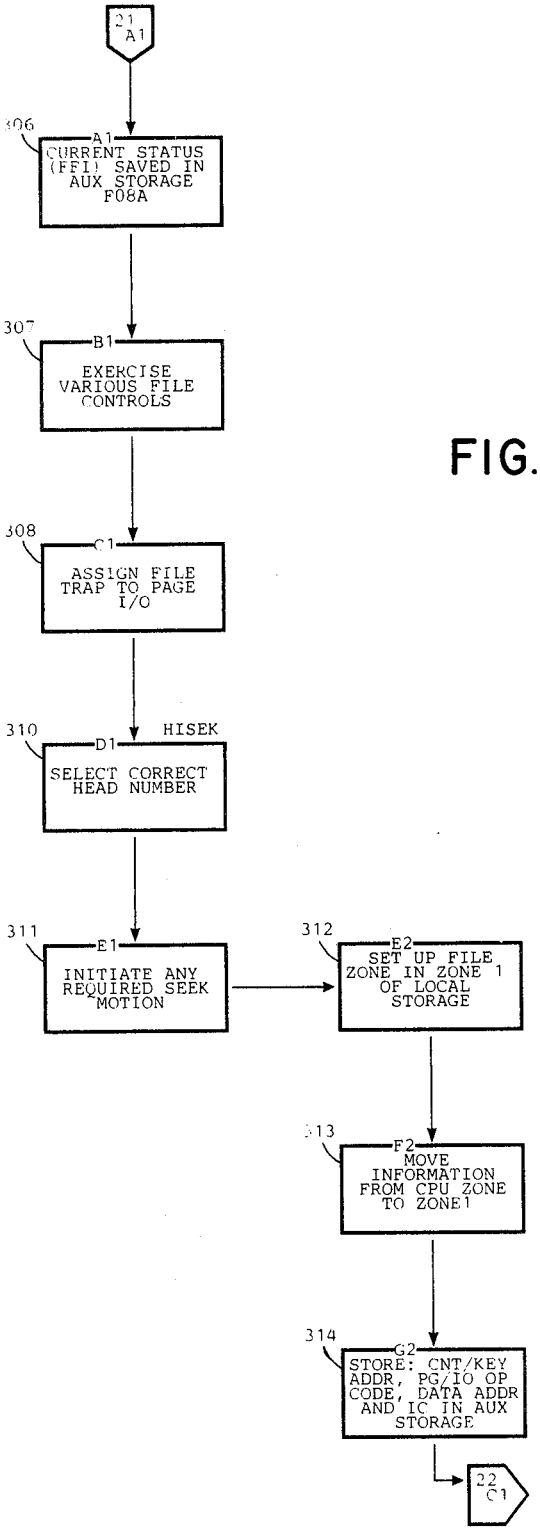
Figure 22:
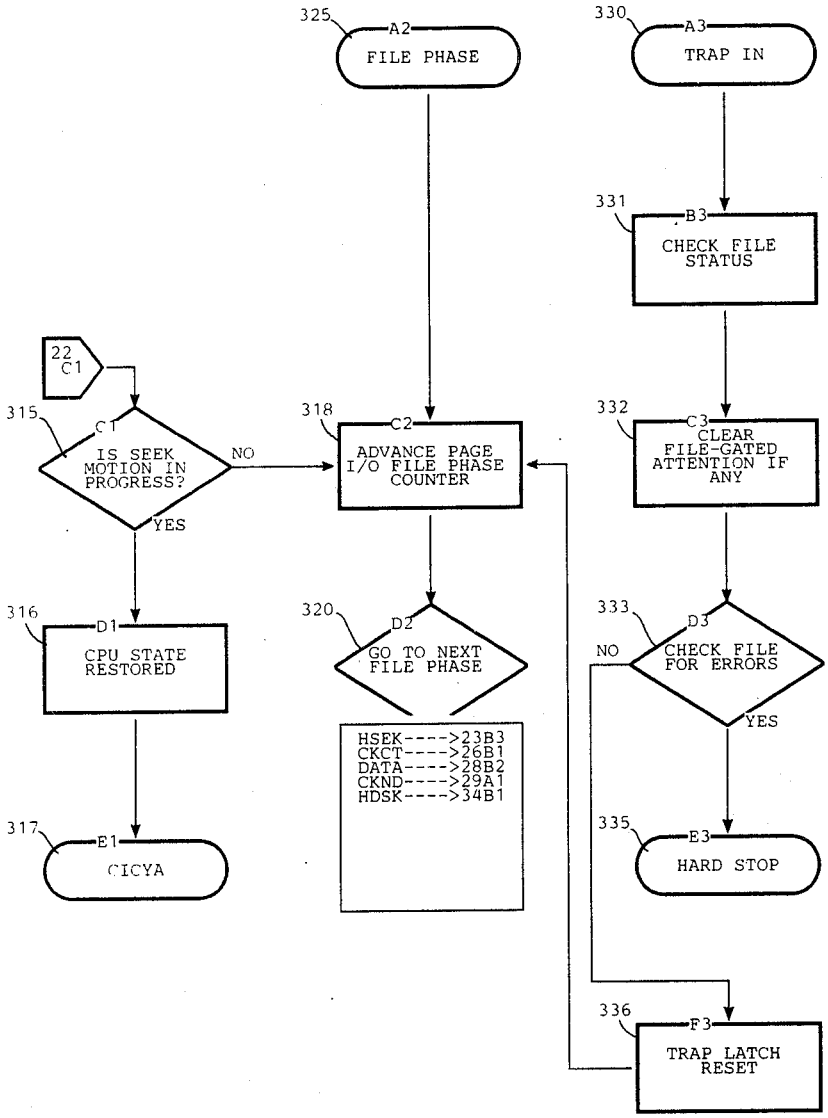
Figure 23:
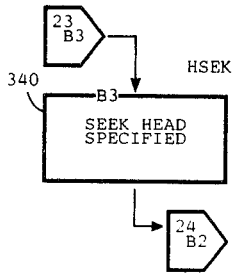
Figure 24:
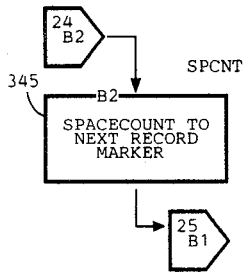
Figure 25:
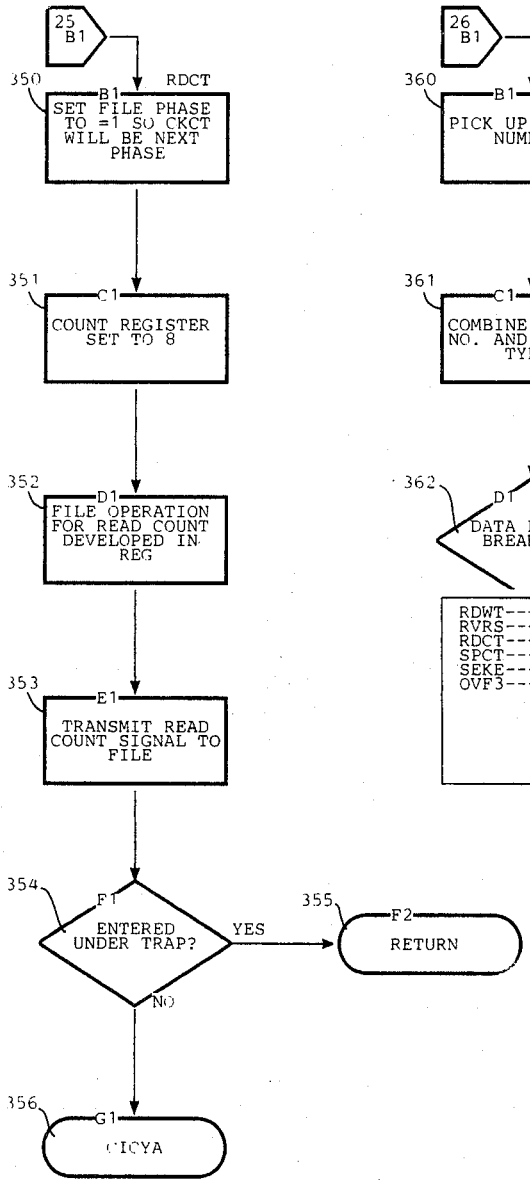
Figure 26:
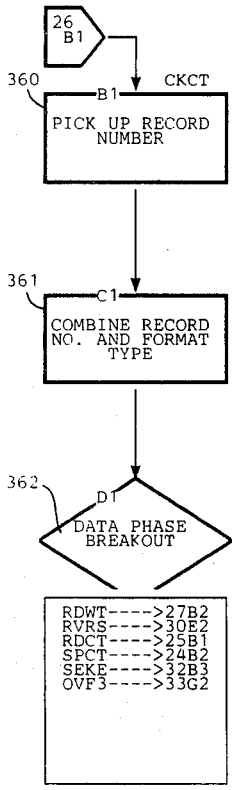
Figure 27:
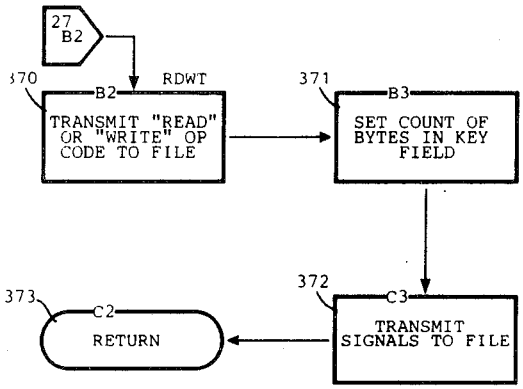
Figure 28:
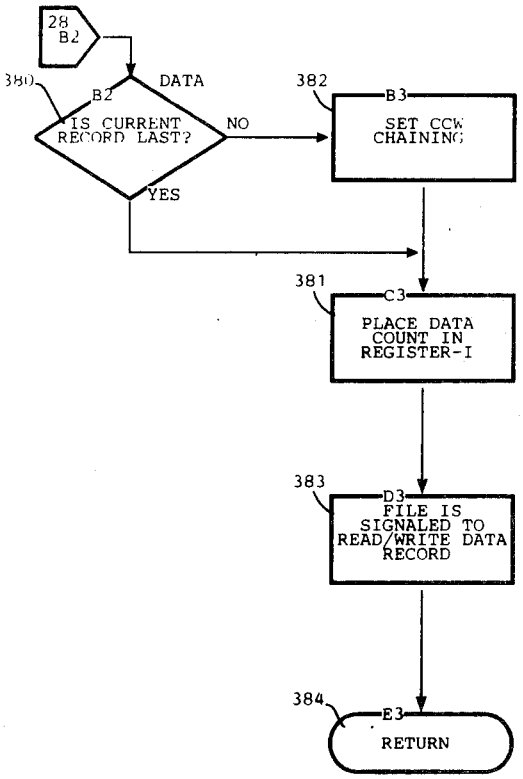
Figures 29, 30:
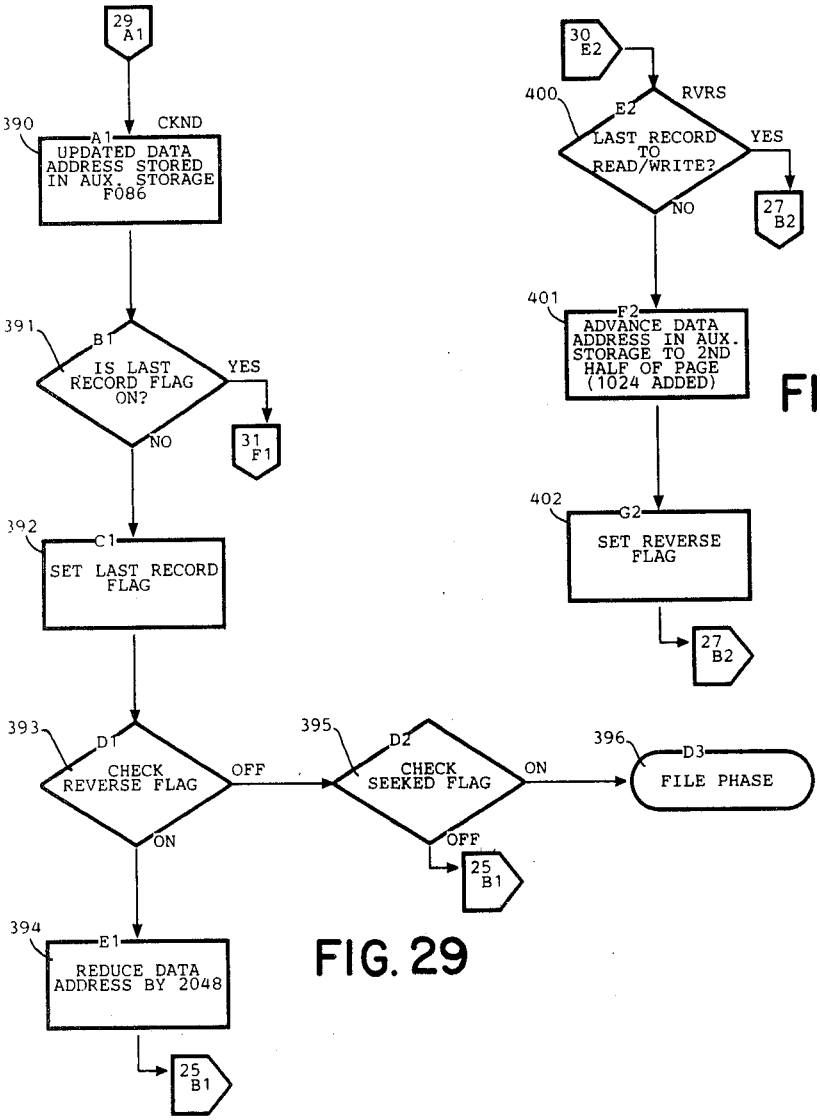
Figure 36:
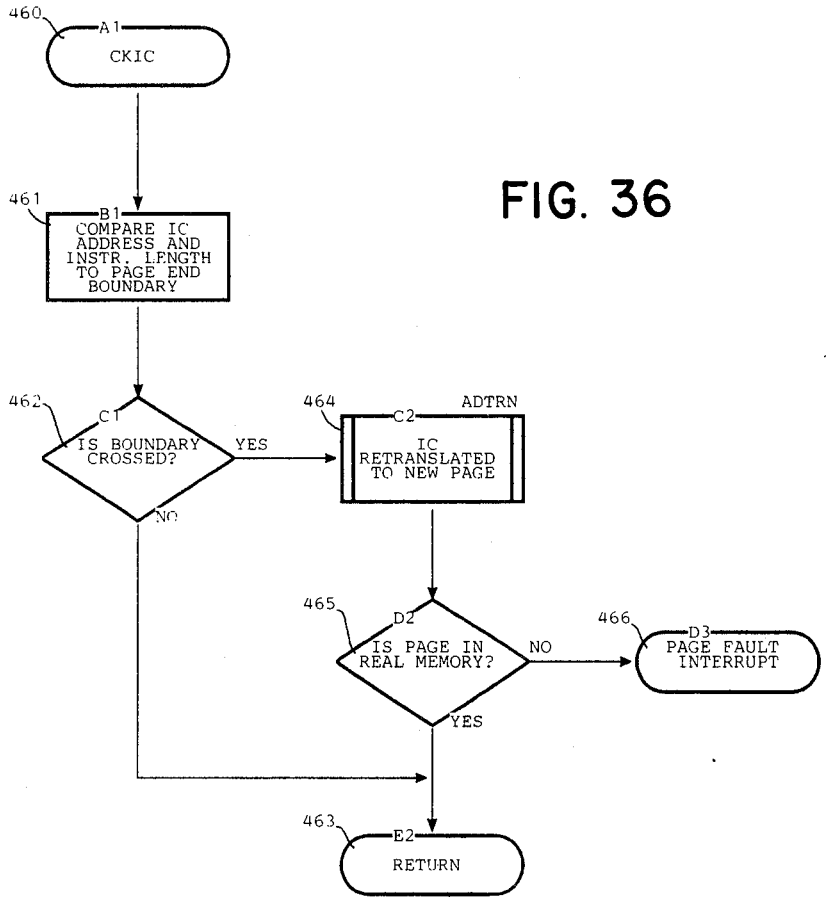
Figure 35:
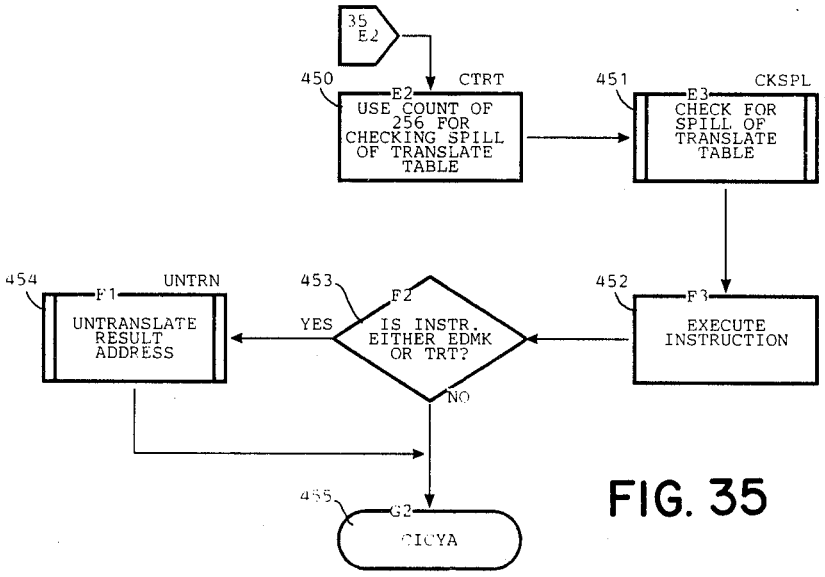
Figure 37:
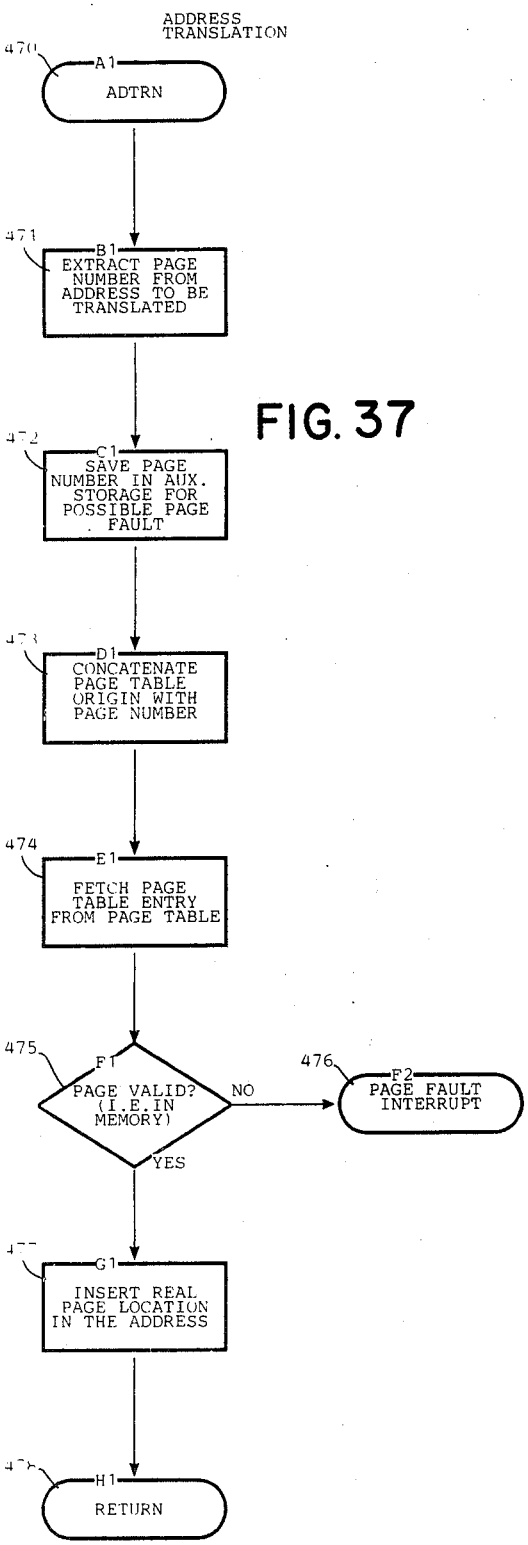
Figure 38:
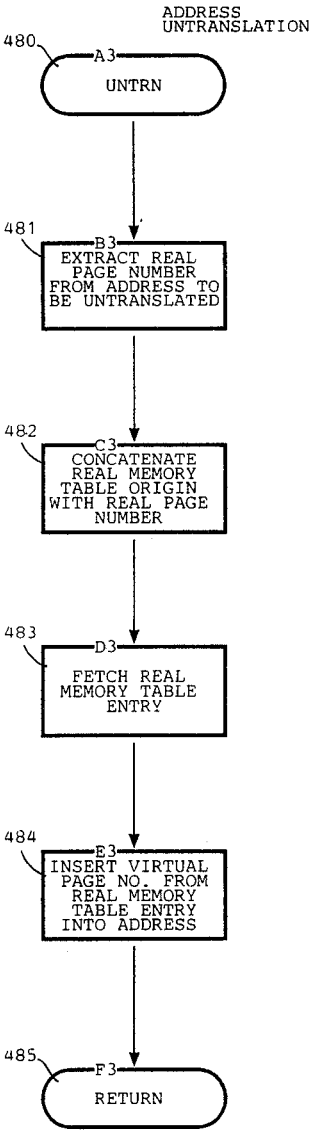
Figure 39:
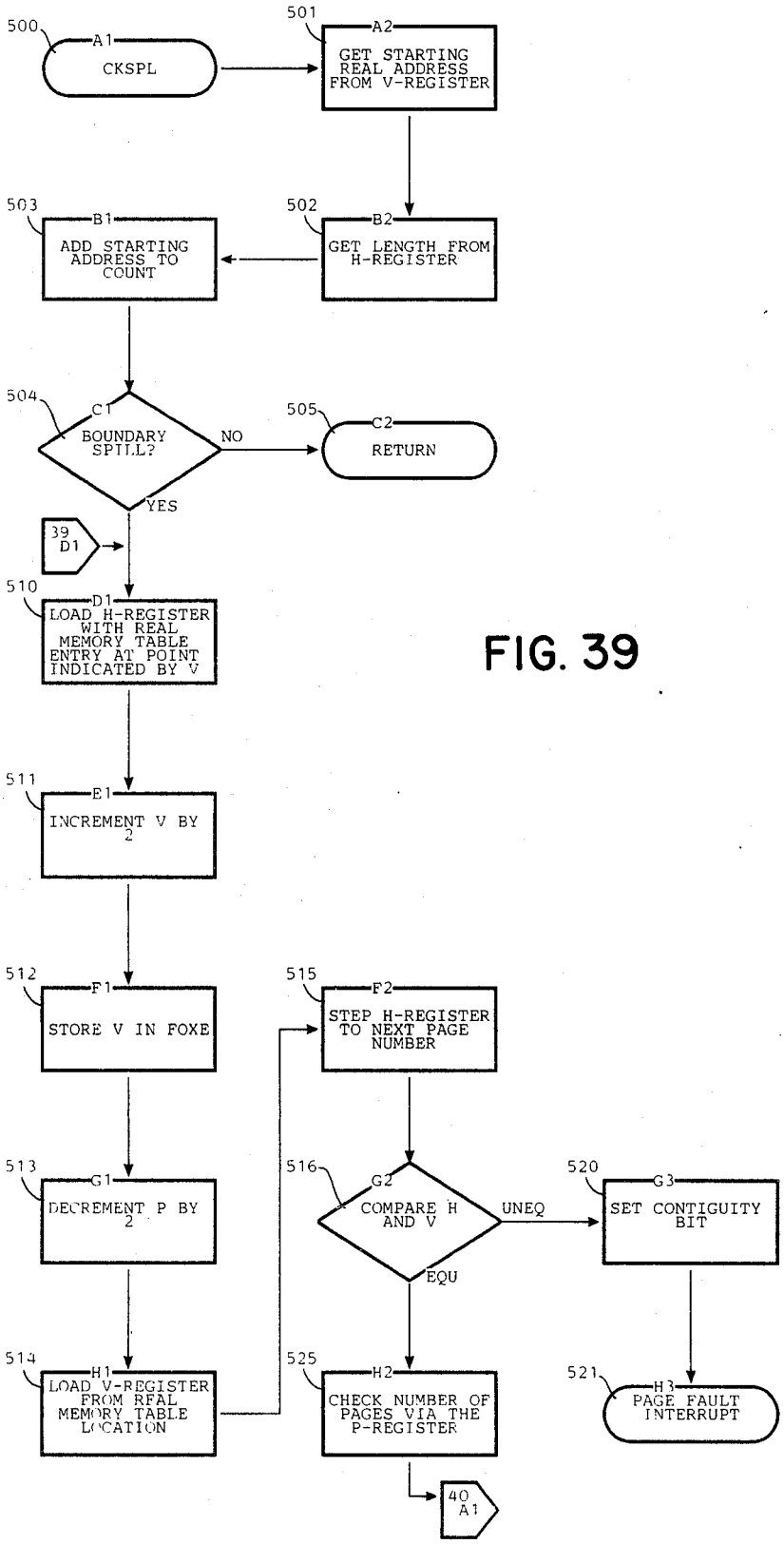
Figures 40, 41:
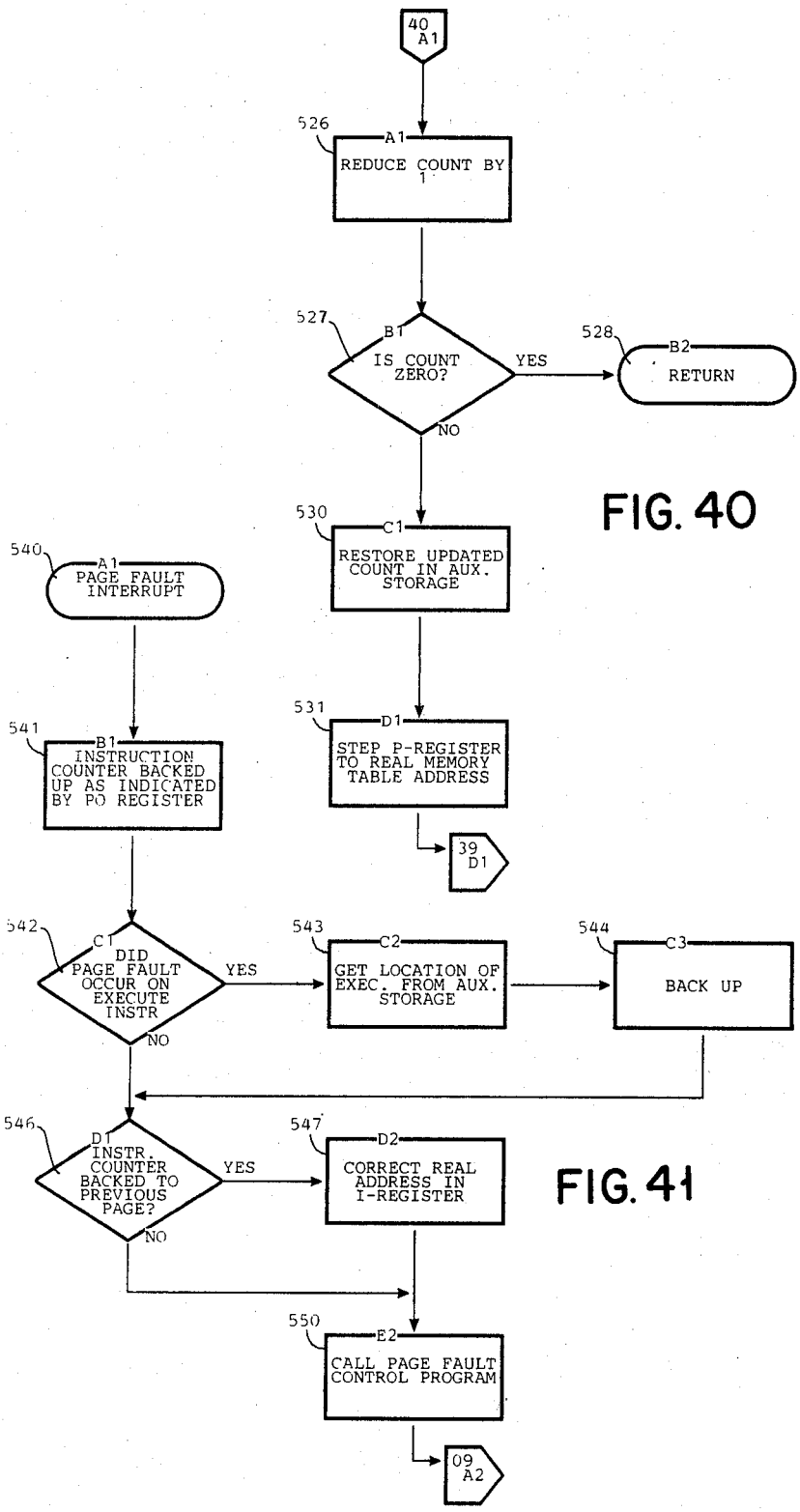
Figure 42:
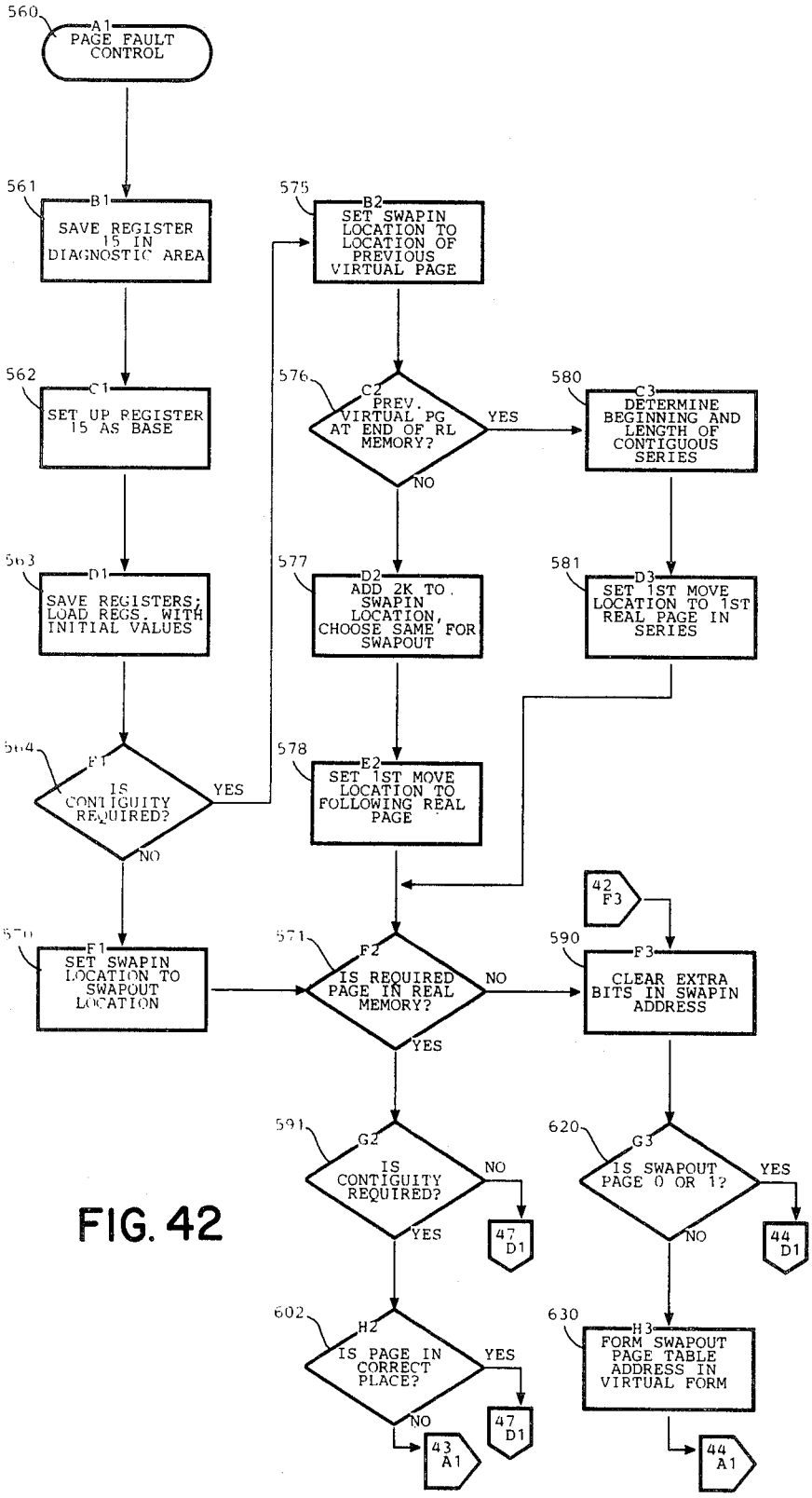
Figure 43:
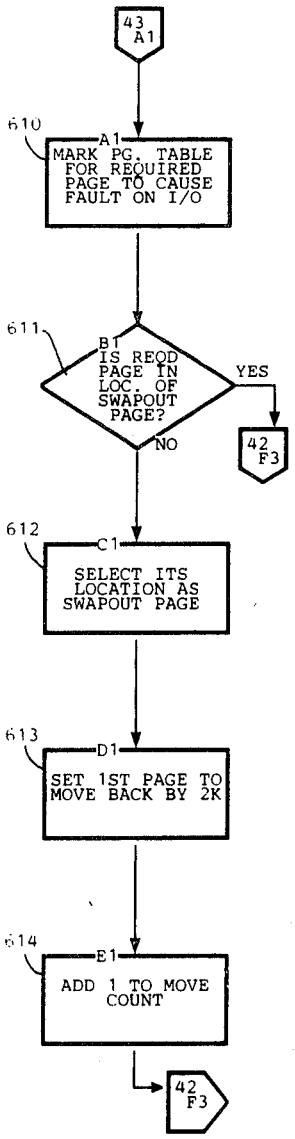
Figure 44:
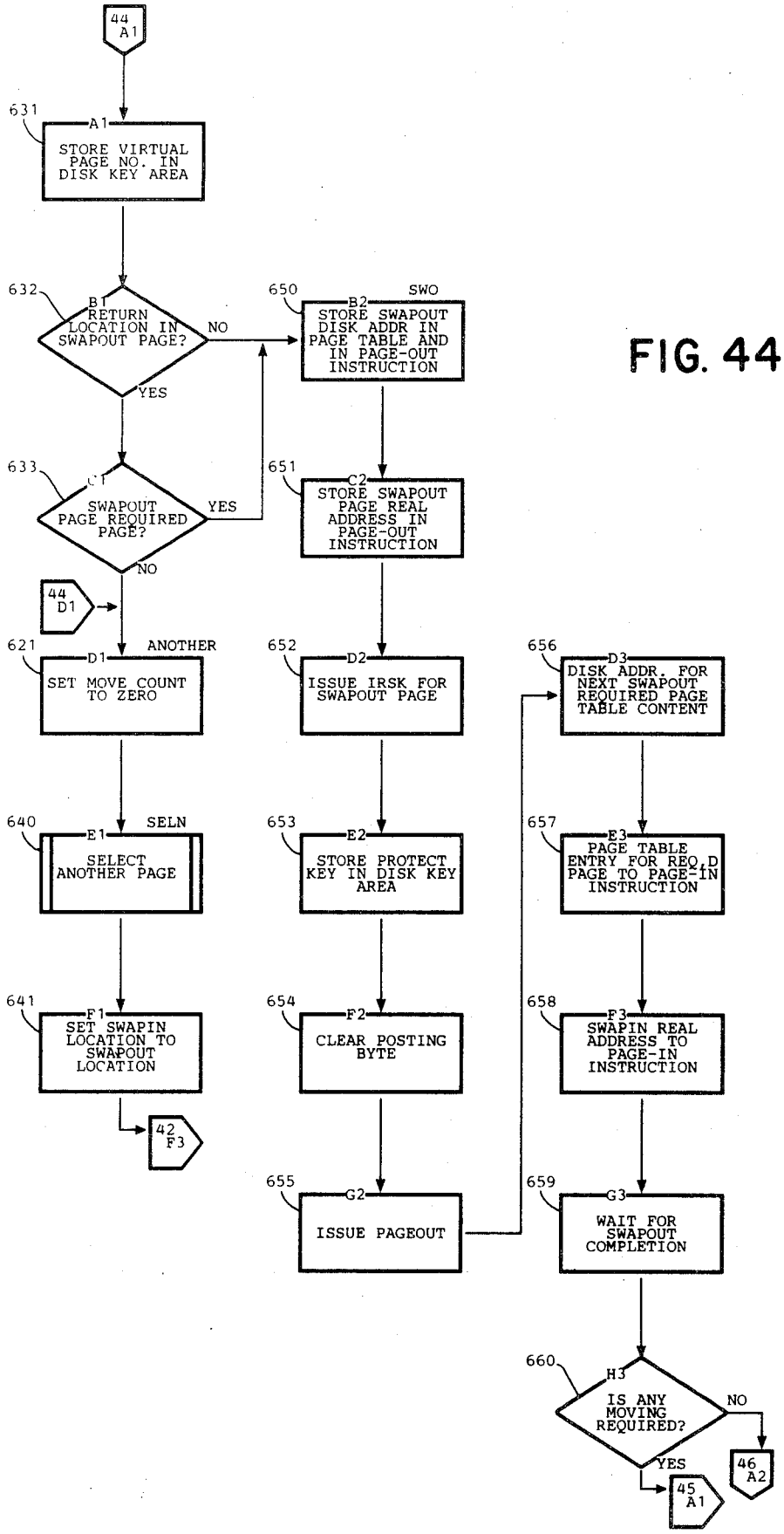
Figures 45, 46:
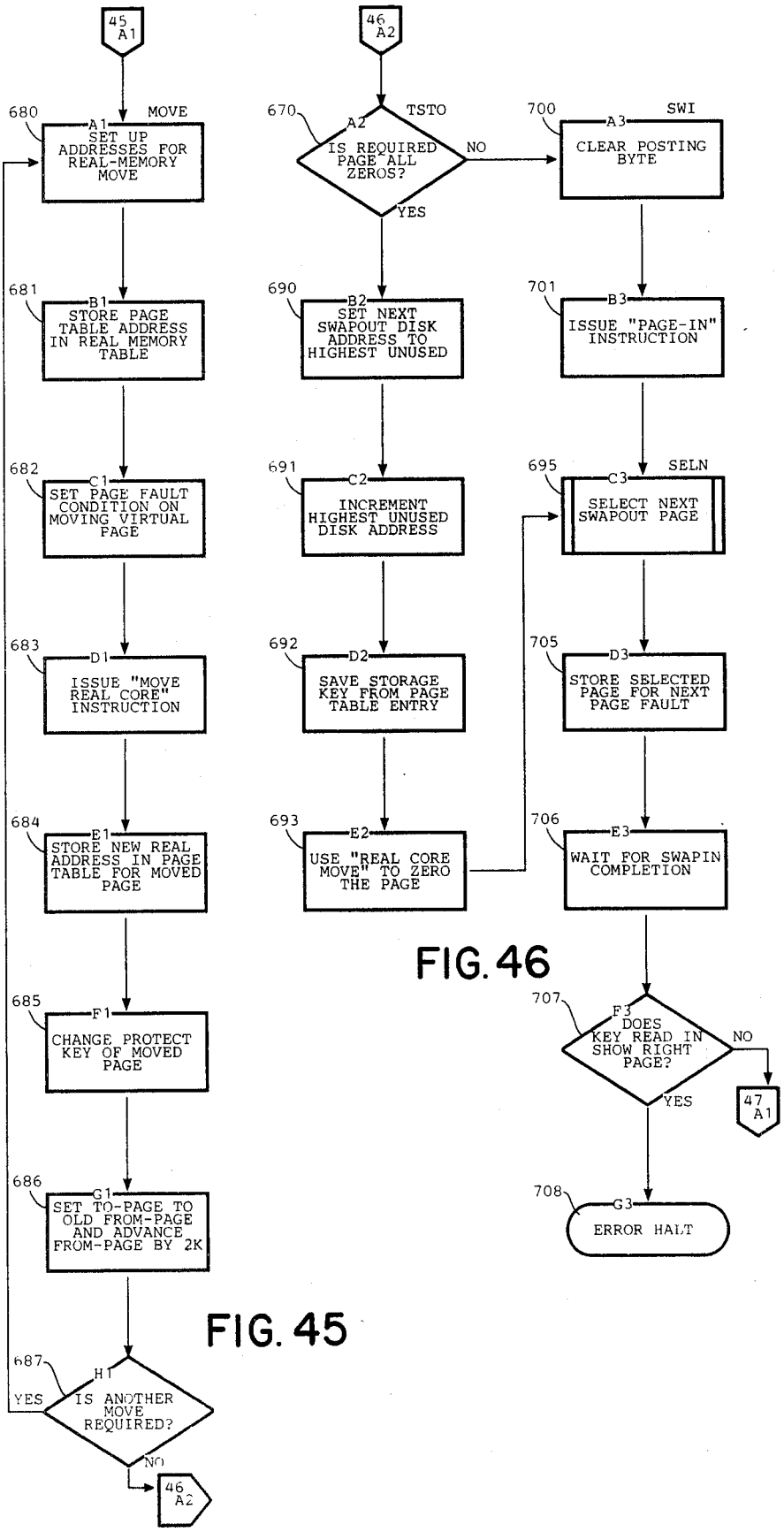
Figure 47:
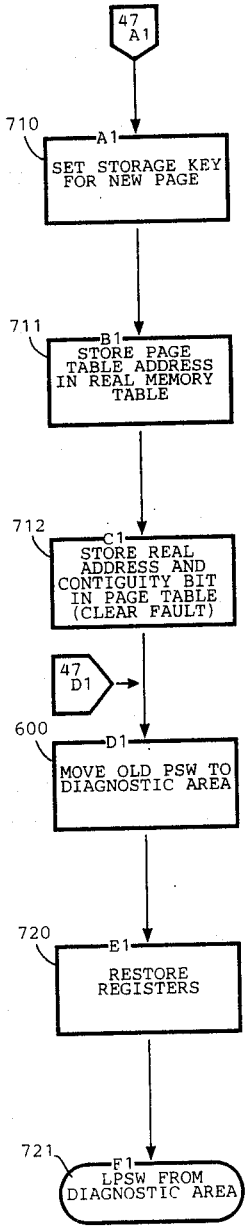
Figure 48:
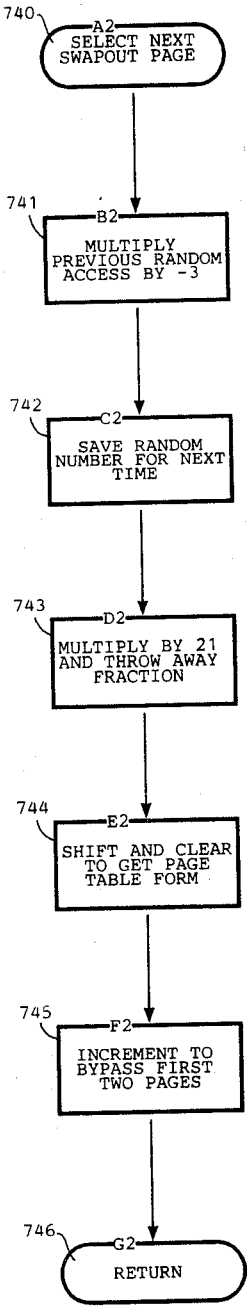

DEFENSIVE PUBLICATION

UNITED STATES PATENT AND TRADEMARK OFFICE

Published at the request of the applicant or owner in accordance with the Notice of Dec. 16, 1969, 869 O.G. 687. The abstracts of Defensive Publication applications are identified by distinctly numbered series and are arranged chronologically. The heading of each abstract indicates the number of pages of specification, including claims and sheets of drawings contained in the application as originally filed. The files of these applications are available to the public for inspection and reproduction may be purchased for 30 cents a sheet.

Defensive Publication applications have not been examined as to the merits of alleged invention. The Patent and Trademark Office makes no assertion as to the novelty of the disclosed subject matter.

PUBLISHED NOVEMBER 4, 1975

940 O.G. 6

T940,003

MEMORY SIZE INDEPENDENT DATA PROCESSING SYSTEM AND METHOD

Charles D. Coleman, Marina Del Rey, Calif., assignor to International Business Machines Corporation, Armonk, N.Y.

Continuation of application Ser. No. 207,508, Dec. 13, 1971. This application Nov. 12, 1973, Ser. No. 415,087

**Int. Cl. G06f *9/12***

U.S. Cl. 444—1

25 Sheets Drawing. 76 Pages Specification

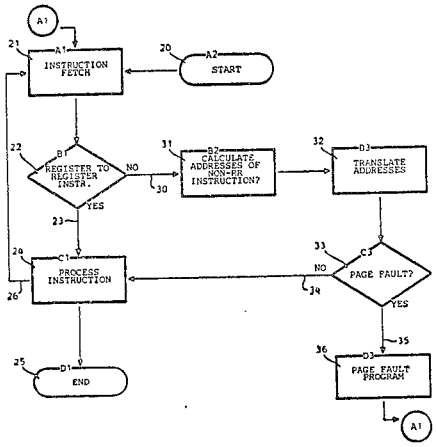

A data processing system having an architecture in which all functions are conducted employing a method of virtual memory addressing, including all input and output functions. Any use of memory by the system, whether for data, program, workspace, etc., is by virtual address, requiring translation to a real address. The sole function employing real addresses is a virtual memory paging operation which is separate from all other input/output functions. In this manner, the system considers all programming and all data to be located in a large virtual memory but which are actually paged into a real main memory as needed.

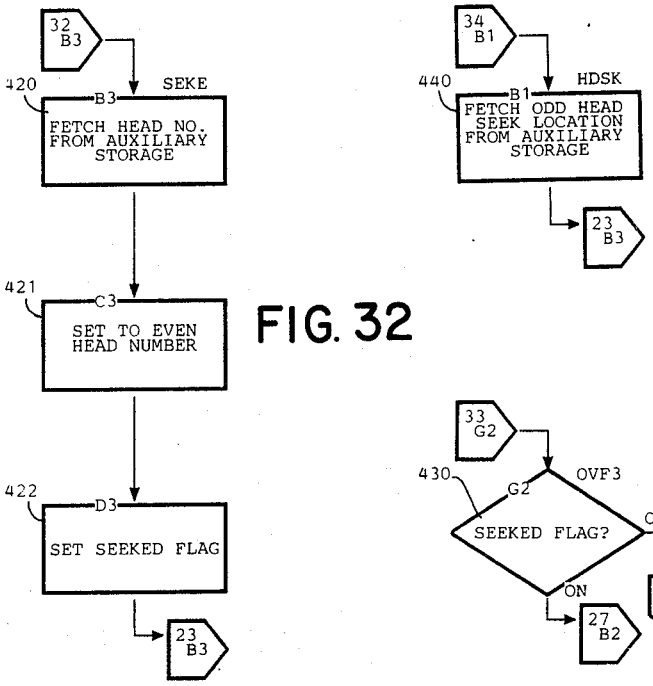
FIG. 32
FIG. 34
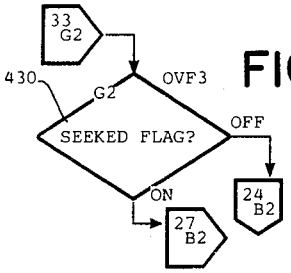
FIG. 33
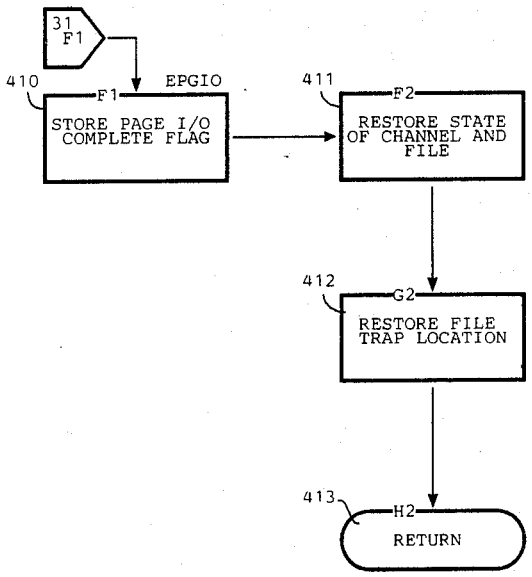
FIG. 31